(12) United States Patent
Marrano et al.

(10) Patent No.: US 7,769,568 B2
(45) Date of Patent: Aug. 3, 2010

(54) EMPLOYING A DYNAMIC LIFECYCLE CONDITION INDEX (CI) TO ACCOMMODATE FOR CHANGES IN THE EXPECTED SERVICE LIFE OF AN ITEM BASED ON OBSERVANCE OF THE ITEM AND SELECT EXTRINSIC FACTORS

(75) Inventors: Lance R. Marrano, Champaign, IL (US); Donald R. Uzarski, Champaign, IL (US); Michael N. Grussing, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 758 days.

(21) Appl. No.: 11/223,251

(22) Filed: Sep. 8, 2005

(65) Prior Publication Data

US 2007/0239368 A1  Oct. 11, 2007

Related U.S. Application Data

(63) Continuation-in-part of application No. 10/886,609, filed on Jul. 9, 2004, now Pat. No. 7,058,544.

(51) Int. Cl.
*G06F 7/60* (2006.01)
(52) U.S. Cl. .............. 703/2; 702/33; 702/34; 702/184
(58) Field of Classification Search ........... 702/34, 702/33, 184; 703/2
See application file for complete search history.

(56) References Cited

U.S. PATENT DOCUMENTS

| | | | | |
|---|---|---|---|---|
| 4,998,208 A | * | 3/1991 | Buhrow et al. ............ | 702/35 |
| 6,021,359 A | | 2/2000 | Sakakibara et al. | |
| 6,047,241 A | * | 4/2000 | Sparago ..................... | 702/34 |
| 6,581,045 B1 | * | 6/2003 | Watson ..................... | 705/400 |
| 6,584,414 B1 | * | 6/2003 | Green et al. ............... | 702/33 |
| 6,597,973 B1 | * | 7/2003 | Barich et al. .............. | 701/29 |

(Continued)

OTHER PUBLICATIONS

D. R. Uzarski, "Development of Condition Indexes for Low Volume Railroad Track" Jul. 1993, total pages of 88.*

(Continued)

*Primary Examiner*—Kamini S Shah
*Assistant Examiner*—Kibrom Gebresilassie
(74) *Attorney, Agent, or Firm*—Earl H. Baugher, Jr.

(57) ABSTRACT

Initial assumptions related to the service life of a particular item, such as a component section of a building, are mathematically modeled to construct an initial lifecycle condition relationship as condition index (CI) v. time. To update the model, empirical data may be input at any time. As modeled in an engineering management system, for example, inspections are performed on the item to verify actual condition with that predicted. Quantitative inspection data are then used to update the initial curve. As inspections are performed and data recorded, the curve is updated to accurately capture observed condition and provide realistic estimates of predicted condition, and expected service life. In select embodiments of the present invention, empirical data, such as that from inspections, are weighted, e.g., inspection data may be weighted based on type, level of detail, time in service, time since last inspection and the like.

17 Claims, 4 Drawing Sheets

U.S. PATENT DOCUMENTS

| | | | |
|---|---|---|---|
| 6,813,532 B2 * | 11/2004 | Eryurek et al. | 700/108 |
| 6,928,391 B2 * | 8/2005 | Fujiyama et al. | 702/185 |
| 7,058,544 B2 * | 6/2006 | Uzarski et al. | 702/184 |
| 7,206,719 B2 * | 4/2007 | Lindsay et al. | 702/177 |
| 7,366,582 B2 * | 4/2008 | Rantala et al. | 700/145 |
| 7,400,770 B2 * | 7/2008 | Keaton et al. | 382/191 |
| 7,437,250 B2 * | 10/2008 | Breen et al. | 702/34 |
| 7,734,488 B2 * | 6/2010 | Grussing et al. | 705/7 |
| 2002/0147681 A1 * | 10/2002 | Taninaka et al. | 705/40 |
| 2003/0097288 A1 * | 5/2003 | Shimomura et al. | 705/8 |
| 2004/0199368 A1 * | 10/2004 | Bechhoefer | 703/7 |
| 2005/0154562 A1 * | 7/2005 | Matsuura et al. | 702/185 |
| 2006/0009935 A1 * | 1/2006 | Uzarski et al. | 702/81 |
| 2007/0033077 A1 * | 2/2007 | Grussing et al. | 705/7 |

OTHER PUBLICATIONS

"Review of Recent Research in hydropower Reliability Analysis" ETL 1110-2-550, May 30, 1997, pp. 1-11.*

A. C. Estes, D. M. Frangopol, S. D. Foltz, "Updating reliability of steel gates on locks and dams using visual inspection results" Engineering Structures 26 (2004), pp. 319-333.*

D. R. Uzarski, "Development of Condition Indexes for Low Volume Railroad Track" Jul. 1993.*

Stockton et al, "Engineering and Design Reliability Analysis of Hydropower Equipment" May 30, 1997, pp. 1-42.*

The REMR Condition Index: Condition Assessment for Maintenance Management of Civil Works Facilities, REMR Technical Note OM-CI-1.2, 1996, pp. 1-5.*

U.S. Appl. No. 10/886,609, filed Jul. 9, 2004, Uzarski et al.

* cited by examiner

EMPLOYING A DYNAMIC LIFECYCLE CONDITION INDEX (CI) TO ACCOMMODATE FOR CHANGES IN THE EXPECTED SERVICE LIFE OF AN ITEM BASED ON OBSERVANCE OF THE ITEM AND SELECT EXTRINSIC FACTORS

RELATED INVENTIONS

Under 35 U.S.C §121,H this application is a continuation-in-part of Ser. No. 10/886,609 filed Jul. 9, 2004, and claims the benefit of, prior co-pending U.S. Pat. No. 7,058,544 B2 Knowledge-Based Condition Survey Inspection (KBCSI) Framework And Procedure, to Uzarski et al., Jan. 6, 2006, incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

An effective infrastructure asset management plan requires the ability to measure current condition and predict the future condition for a wide variety of individual building components. Then, repair and replacement strategies can be applied for a building component before failure or breakdown occurs, avoiding chaotic budgeting and inopportune downtimes.

To maximize the efficiency of an asset management plan, it is essential to minimize expense due to delayed or overlooked maintenance. This requires scheduling inspections, preventive maintenance and repairs to occur at the appropriate time in the lifecycle of a building component. That is, maintenance, upgrades, and major and minor repair should occur before the condition deterioration of the component accelerates and resultant costs increase exponentially.

Thus, it is important to know the condition of assets down to the building component-section level, and the rate at which that condition deteriorates. Some engineering management systems (EMS) quantitatively measure component-section condition. An example of an EMS for automated quantitative condition measurement is BUILDER®. BUILDER® computes a condition index (CI) value for each component-section based on an objective condition assessment process, e.g., one or more inspections. This information can be used in establishing a dynamic, or "self-correcting," mathematical relationship between the CI and service life for a component-section, thus mathematically modeling condition deterioration trends using the most recent inspection data available.

Embodiments of the present invention may be used to complement an EMS such as BUILDER®. BUILDER® is under continuing development by the U.S. Army Corps of Engineers at its Engineering Research and Development Center-Construction Engineering Research Laboratory (ERDC-CERL) in Champaign, Ill.

BUILDER® combines engineering, architectural, and management methods and processes with data base management software to provide quantitatively based facility performance measures. BUILDER® provides engineers and facility managers with an automated tool to support decisions regarding what, when, where, and how best to maintain buildings.

BUILDER® consists of three interrelated activities: data collection in the field; data entry into a database management system and other data management activity; and manipulation of the resultant database for decision support. BUILDER® supports: assessing condition objectively, establishing minimum acceptable condition criteria, budgeting, exploring "What if" scenarios, prioritizing work, developing annual work plans, monitoring contractor performance, establishing a condition history, and scheduling re-inspection. BUILDER® also accommodates automating the presentation of data to decision makers in briefings and reports.

BUILDER® provides outputs such as: automated inspection procedures and schedules, benefit analyses, budget optimization analyses, and engineering analyses, all with enhanced graphics for presentation to decision makers. Because BUILDER® uses a standard database software program, it interfaces easily with other EMS programs using the same or compatible database software developed by ERDC-CERL. These other EMS programs include ROOFER®, PAVER™, PIPER™, RAILER™ and like programs covering facilities one is likely to see on a major military installation or in any city.

BUILDER® uses as its primary condition metric a condition index (CI) rating on a scale of 0-100. The CI for a component-section is computed from inspection data that records the type, severity, and density of each discovered "problem" or "anomaly" (termed "distress" in BUILDER®). Empirically developed deterioration curves (termed lifecycle condition curves in select embodiments of the present invention) show the optimal point at which maintenance work should be done to avoid costly rehabilitation or premature replacement.

With the assistance of the IMPACT™ simulation program included with BUILDER®, facility managers can develop long-range work plans based on a sound investment strategy. By providing an objective description of condition and an automated means of exploring various options under different budget scenarios, BUILDERS® and IMPACT™ together facilitate formulating multi-year work plans and quantifiably justifying funding requests.

The current version of BUILDER®, version 2.2, was released in December 2003. A new version of BUILDER®, version 3.0, is under development with many enhanced features. One such feature is the use of more sophisticated component condition prediction models as described in this patent. BUILDER® version 3.0 will have the enhanced ability to project condition degradation trends for individual components and families of similar components.

Although BUILDER® was developed for military installations, it may be used by any organization that has facility management responsibilities. There are new features and program enhancements in BUILDER® that improve the user interface and advance the science of building asset management. A list of the most significant enhancements is provided below.

BUILDER® Stand-Alone Remote Entry Database (RED) has been improved for greater ease of use while in the field. These enhancements translate into significant speed and accuracy improvements during the inventory and condition survey inspection (CSI) collection process.

BUILDING COPY and BUILDING TEMPLATES are significant features. The one-time collection of building data is the most costly phase in BUILDER® implementation. As a result, BUILDER® v.2.2 has added features to facilitate this process. When a group of buildings are identical or nearly identical and all built around the same time, the "BUILDING COPY" feature is a useful tool. It allows collecting the inventory for one building and copying it to describe other similar buildings. This bypasses the need to inventory each like building separately. In addition, for a "typical" building, i.e., one not identical to other buildings in your portfolio but basically alike, a "BUILDING TEMPLATE" may be created for that building type. For all buildings of the same type a system inventory may be completed from that template. Inventory quantities may be scaled according to building size and the current template may be adjusted to ±10%. Each "component-section" of the building is initially dated automatically to the year of construction of the building. Multiple such templates may be created and stored in an e-library.

The feature Installation Date Estimation has been enhanced. In BUILDER® v.2.2, the assumption is made that component-sections are replaced after a reasonable expected (predicted) lifecycle. Version 2.2 compares the age of the building to the Expected Service Life of the component-section to develop an accurate default value for the installation date. This feature facilitates quickly creating a mathematical inventory model. When BUILDERS® automatically creates the system inventory, the estimated age of each component-section is developed from current data, yielding accurate projections of condition.

The feature Estimation Date Check Box in BUILDER® v.2.2 also recognizes that many times the installation date for many component-sections is unknown. A check box is used to flag such instances. When checked, the installation date is displayed with a yellow background, indicating an estimate. Estimated dates are also denoted on the system inventory report to alert of the need to verify installation dates.

The feature Distress CSI with Quantities is enhanced. In addition to choosing an estimated range for the affected distress density, BUILDERS® v.2.2 allows the option of entering the quantity of measured component-sections and affected distress quantity. BUILDER® v.2.2 then calculates an appropriate density range from this input. For large samples, this feature provides an accurate estimate of the affected quantity. In addition, it provides quantitative information about a given distress for planning scope of repair or replacement work.

The feature Project Creation has been added. With previous versions of BUILDER®, the component-section is the fundamental "management unit." While also true for v.2.1, in BUILDER® v.2.2 component-section work items may be combined for management as a single project. Thus, the project planning, funding, execution, and completion of these work items may be controlled under a single project. These projects are prioritized and ranked and compete for funding with other items in the work plan list.

The feature Automatic Inventory/Inspection Updates has been added. As work is denoted, as completed in BUILDER® v.2.2, inventory and inspection records are automatically updated. This includes updating the year installed, material/equipment category and component-section type and quantity in the inventory if a component-section is replaced. Automatic inspection dates are scheduled to reflect the improvement in condition when items are replaced, repaired, or painted.

The feature Fiscal Start Date Configuration has been added. BUILDER® v.2.2 allows for a fiscal year start date. This date is used by IMPACT™ to estimate completion dates for both existing line items and evaluation of new work items.

The IMPACT™ program has been released in v.1.1. Some of the key enhancements of v.1.1 are discussed below.

System Selection for IMPACT™ Simulation has been added. IMPACT™ v.1.1 permits defining the scope of an IMPACT™ scenario for selected systems. Thus, for example, separate work plans for Roofing, HVAC, or interior work may be created. By running simulations for only select systems, the processing time for IMPACT™ simulation is decreased.

The feature Building Status Changes has been added. IMPACT™ identifies building status changes that will take place within the horizon of a scenario. For example, if a building is scheduled to be demolished within the time frame of a multi-year simulation, IMPACT™ v.1.1 recognizes the status change and applies a different standard level to the building so as not to budget money for renovation as it nears demolition.

The feature Adding Buildings During an IMPACT™ Scenario has been added. IMPACT™ v.1.1 permits identifying when a new building footprint enters inventory. These new buildings are entered automatically into the simulation and compete for funding with existing inventory.

The BUILDER® facility management hierarchy is designed so that the constituent building components, one of such being air conditioners, for example, are grouped and classified into systems, one of such being HVAC. These systems are the major parts of the building. A component-section further divides components based on characteristics such as material, type, age, and location within the building. For example, a wall (component) may be constructed of component-sections of masonry or wood. The different materials have different responses to their environment over time, and require different work actions at different stages in their lifecycle. Each component-section works interdependently with other component-sections to support the functions of an efficiently operating facility. As these component-sections age in use, their condition may also deteriorate. This deterioration has an effect on the performance and reliability of the component-section to serve its purpose (mission). If left in service sufficiently long, the condition reaches some limit, or failure state, at which the component-section is no longer serving its function adequately. This may adversely affect the function or condition of other component-sections. Certain component-sections, such as structural columns, have a service life designed to correspond to the life of the facility. Other component-sections, such as a roof surface, have a projected lifespan much shorter than the life of the facility. For the latter type, periodic repair or replacement of the component-section is needed to restore it. Depending on the criticality of the component-section, this corrective action is best performed at or before reaching failure.

However, predicting this failure state for a unique component-section as used in a specific building is difficult because the actual lifespan of a component-section is rarely known a priori. While a designer or manufacturer may provide an estimate of component life, actual life depends on local environmental factors, use and abuse, levels of routine maintenance accomplished, and the like. In addition, for many component-sections, simply defining what constitutes a failure state can sometimes be ambiguous. For instance, does a window component-section fail when the vapor barrier is breached, when it is no longer operable, when a windowpane breaks, or some other criteria? Thus, failure state could have a different meaning for different component-sections and to different people. Therefore, defining a quantitative failure state based on an objective CI provides a consistent definition of failure state.

The failure state is rarely the most efficient point in the lifecycle of a component-section to perform corrective action. For many component-sections, maintenance, upgrade, or repair early in the lifecycle extends life, avoiding expensive damage caused by accelerated deterioration later. The theoretical point at which minor corrective action is most efficient is termed the "sweet spot" in the lifecycle. Performing maintenance or repairs at the sweet spot results in cost savings as compared to major repair or replacement later in the lifecycle.

Each component-section has a unique actual lifecycle, although like component sections may be grouped and any given component-section in the group given a mathematically estimated "likely" or "predicted" lifecycle based on a calculated average for use in "average" installations and average conditions. However, a component-section may perform to a certain level in a given building while a like component-section in a second building performs differently. This is because variables affecting the condition of the component-section are not of the same combination and amount in the two buildings. Variables include original construction quality, environmental and climatic effects, normal aging, excessive or abusive use, scheduled maintenance and performance thereof, and the like. This variability includes not just the component-section in question, but also interrelating component-sections and systems. Thus, any mathematical condition lifecycle model must be sensitive to this uniqueness. The resulting mathematically modeled condition lifecycle curve (CI vs. time) must be dynamic, i.e., "self-correcting," as additional specific condition assessment data for the component-section are entered into the mathematical model.

Proactive asset management requires accurate accounting and assessment of infrastructure and the development of a plan for renewal and replacement. An important part involves planning for timely corrective action before deterioration impacts both the budget and the mission. Therefore, to efficiently and objectively manage the repair and replacement of an asset, prediction of its condition state throughout its lifecycle, i.e., condition lifecycle, is required. Condition assessment, condition prediction, work requirements analysis, and prioritization are all important in this new environment. In select embodiments of the present invention, dynamic (or "self-correcting") condition lifecycle mathematical modeling procedures improve asset management by providing a tool for prediction via mathematical relationships that are based in part on the results of actual inspection data.

DETAILED DESCRIPTION

Figure 1B:
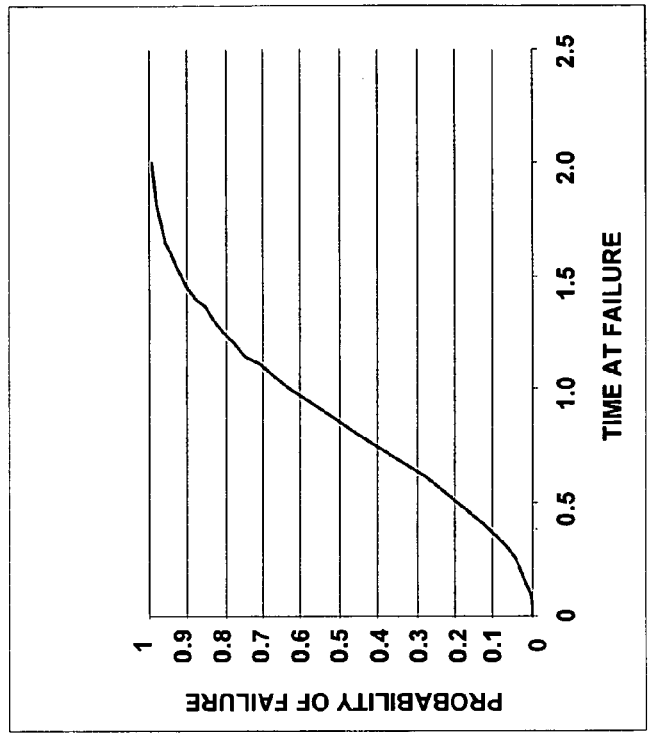
FIG. 1B represents a typical statistical cumulative failure distribution for estimating the probability that something will fail at or before a given year as available in the prior art.

In select embodiments of the present invention, a mathematical model establishes and updates a mathematical relationship between a condition index (CI) of an item and time. In select embodiments of the present invention, the model comprises processor-readable media containing: one or more assumptions related to the item; empirical data comprising data points related to the item, such that some updating utilizes the data; one or more algorithms using one or more of the assumptions and the data as input, such that the algorithms enable defining a condition lifecycle; and code for implementing the algorithms. Also provided are one or more processors communicating with the processor-readable media and configured to execute the code.

Select embodiments of the present invention comprise a tool for use in managing operations and maintenance (O&M) of facilities incorporating multiple items, the tool implemented on computer readable media. The tool incorporates one or more mathematical models that employ pre-specified parameters to adjust a condition index (CI) for one or more of the items at a given time, the model adjusting the CI statistically to reflect at least observed changes to the items. In select embodiments of the present invention, the changes may be input as updates to data in pre-specified categories, data in one or more categories of data representing assumptions and comprising data points, such that one or more assumptions are related to an individual item, the assumptions asserted as one or more limitations in the mathematical models. In select embodiments of the present invention, data of a second type in one or more categories of data representing at least some empirical observations related to the one or more items, such that some updates utilize at least some of the data of a second type. In select embodiments of the present invention, one or more specially configured computers communicate with the computer readable media, the specially configured computers specially configured to execute one or more of the mathematical models and the computers are connected to one or more, such that on one or more of the displays, the adjustable CI is presented as a graph of CI versus time, and such that use of the tool yields quantitative measures of the impact on O&M lifecycle cost of upgrades, repairs, preventive maintenance and like actions to the one or more items.

In select embodiments of the present invention, assumptions related to the item provide at least some mathematical model parameters, the assumptions initially being: the CI is between 0 and 100; the CI is 100 at the start of service life of the item; the CI approaches zero asymptotically; the service life of the item is defined at a pre-specified value of CI occurring at a pre-specified time; and the CI decreases over time without enhancements to the item.

In select embodiments of the present invention, empirical data are selected from the group consisting of: data on enhancements made to the item, data from inspections made of the item, historical data related to the item type, historical data related to a replaced item of the same type, industrial data related to the item, and combinations thereof.

In select embodiments of the present invention, the enhancements are selected from the group consisting of: corrective actions, repairs, upgrades, preventive maintenance, scheduled maintenance, and combinations thereof.

In select embodiments of the present invention, the model parameters are a, α, and β as used in the mathematical relationship defining a Weibull distribution, $$C(t) = a \times e^{-(t/\beta)^\alpha} \qquad (1)$$

Where:

C(t)=the condition index (CI) as a function of time, t=the time (years) since an item was installed or constructed, a=parameter, initial steady state condition index, β=parameter, service life adjustment factor, α=parameter, accelerated deterioration factor.

In select embodiments of the present invention, the pre-specified value of the CI is between about 60 and 80 when the pre-specified time in service is between about 60 and 80% of the service life. In select embodiments of the present invention, the pre-specified assumption is that the value of the CI is about 70 when the time in service is about 70% of the service life.

In select embodiments of the present invention, the media contain one or more factors to adjust for differences in empirical data upon updating of the model. In select embodiments of the present invention, the factors comprise one or more weighting scales that may be applied to some of the empirical data.

In select embodiments of the present invention, the model employs regression analysis to fit a curve by minimizing a "sum of the squares" residual error, such that each data point is associated with a weighting factor that modifies the residual error of that data point. The more accurate the data point is the higher the value of the weighting factor is in defining an adjusted condition lifecycle curve. In select embodiments of the present invention, the adjusted condition lifecycle curve passes through a last known plot of the condition index.

In select embodiments of the present invention, a method is provided for employing a mathematical model relating a condition metric for an item to time, comprising: applying the Weibull distribution and using one or more quantitatively described assumptions related to the item and empirical data collected about the item in applying this distribution.

In select embodiments of the present invention, an engineering management system (EMS) incorporates at least one mathematical model establishing and updating a condition lifecycle of an item as defined by a mathematical relationship between a condition index (CI) and time. The model comprises processor-readable media containing one or more assumptions related to the item; empirical data, comprising data points, related to the item, such that some updating utilizes the empirical data; one or more algorithms using some of the assumptions and some empirical data as input, such that the algorithms enable defining the condition lifecycle; code for implementing the algorithms; and one or more processors to communicate with the media, the processors configured to execute the code, such that the EMS is employed to optimize management of the item.

In select embodiments of the present invention, the EMS employs the BUILDER® program.

In select embodiments of the present invention, a method is provided for implementing a mathematical model establishing and updating a mathematical relationship between a condition index (CI) of an item and time. The method comprises: 1) selecting an item for evaluation; 2) choosing at least one mathematical relationship for modeling; 3) choosing at least one initial assumption related to the relationship; 4) applying the initial assumptions in the model; 5) running the model; 6) gathering empirical data, comprising data points, related to the item; 7) entering the empirical data in the model; 8) re-running the model; and 9) repeating steps 6-9 as necessary to update the model during the service life of the item. In select embodiments of the present invention, the method further comprises gathering empirical data for input to steps 2 and 3.

In select embodiments of the present invention, provided is computer-readable media containing code representing instructions to cause a computer to employ in one or more mathematical models one or more assumptions related to an item; to input into the models empirical data, comprising data points, related to the item; to update the models, such that updating utilizes some of the data; and to employ one or more algorithms using some of the assumptions and some of the data as input, such that the algorithms enable defining a condition lifecycle relationship for the item.

In select embodiments of the present invention, the processor-readable media contains one or more factors to adjust for differences in the empirical data upon updating of the model. In select embodiments of the present invention, the factors comprise one or more weighting scales that may be applied to some of the empirical data.

In select embodiments of the present invention, the processor-readable media further employs regression analysis to fit a curve by minimizing a "sum of the squares" residual error, such that each data point is associated with a weighting factor that modifies the residual error of that data point; the more accurate the data point is, the higher the value of the weighting factor in defining an adjusted condition lifecycle relationship, such that the adjusted condition lifecycle curve passes through a plot of a last known condition index.

In select embodiments of the present invention, mathematical condition lifecycle models are initiated with reasonable initial assumptions and dynamically update ("self-correct") a condition lifecycle relationship (curve) based on collected data, such as inspection data.

In select embodiments of the present invention, mathematical models "automatically" adjust relevant metrics, such as the expected service life (ESL) of a component-section, based on localized conditions observed from a condition assessment, such as a facility inspection.

In select embodiments of the present invention, mathematical models update ("calibrate") a metric, such as a condition lifecycle curve, by incorporating data, such as the time of occurrence of an inspection and the type of inspection.

In select embodiments of the present invention, mathematical models adjust a condition lifecycle relationship based on historically observed data such as when enhancements to an item, such as a component-section, are completed.

In select embodiments of the present invention, mathematical models enable adjustment to a condition lifecycle relationship for an enhancement to an item, such as a component section, when updating and projecting a condition lifecycle relationship (curve) or trend.

When managing assets such as buildings, consideration is given to each constituent component-section in a building having a finite service life. Note that service life is conceptually different from economic life that may account for obsolescence and like issues. Thus, service life establishes a point in the lifespan or lifecycle of the component-section. Although the building component-section may not last forever, its service life may be extended with proper operation, maintenance, repair, upgrades, and the like. Conversely, service life may be significantly decreased by environmental factors, abusive operation, lack of maintenance, and the like. Because of these factors, a wide estimated range for service life may exist. Further, there is a limit to the certainty to which service life may be estimated at construction or installation of the component-section.

Figure 1A:
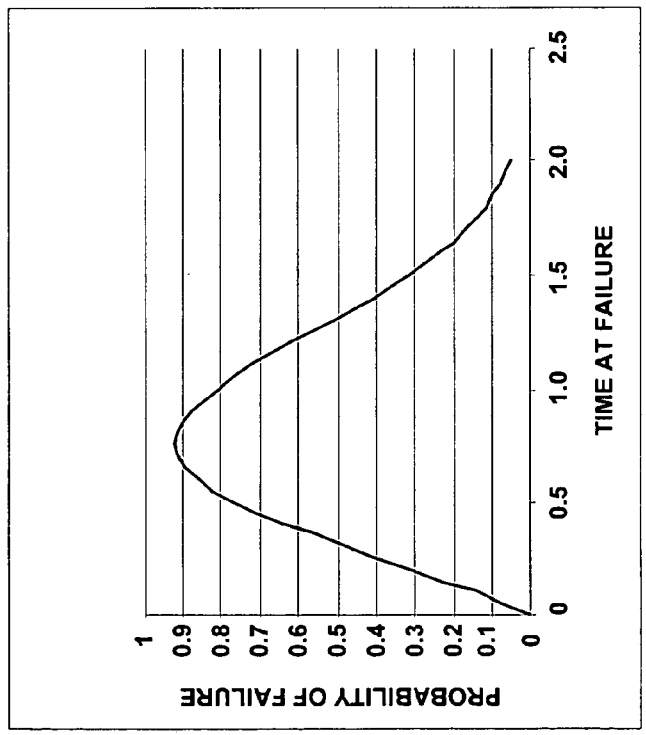
FIG. 1A illustrates the statistical time to failure that describes a hypothetical component-section defined by a "normal" probability distribution as available in the prior art.

Refer to FIG. 1A illustrating a "normal" probability distribution (bell curve) for the time to failure of an item, such as a component-section. The design service life may be defined as the "average" time in service at which the component-section has the greatest probability of failing. Depending on the variance of the service life within a family of like items, such as component-sections, there is some probability that the actual life is different from design service life. The design service life for each of a wide range of component-sections is published in different sources, based on industry estimates.

Unfortunately, very little data exist on the variance associated with service life. If the variance for the time from component-section construction or installation to failure were known, then the statistical probability of that component-section failing at a given year in its lifecycle could be defined.

Refer to FIG. 1B depicting a typical cumulative failure distribution that relates the probability that a certain type of item, such as a component-section, will fail at or before a given year. This distribution may be used in a simple conventional management approach to asset management, i.e., relying on the item to behave as a statistical distribution indicates and taking action based solely thereon.

Figure 1C:
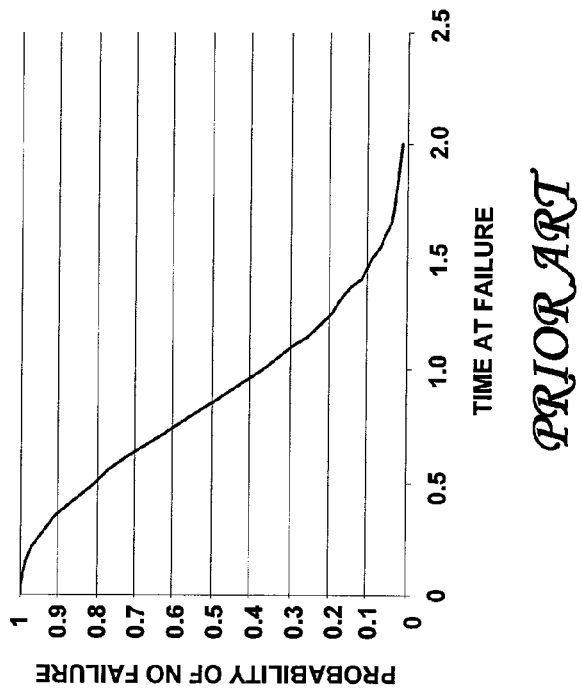
FIG. 1C depicts a typical statistical probability distribution that something will meet or exceed performance standards at a given year in its lifecycle as available in the prior art.

Refer to FIG. 1C representing a typical probability distribution describing the statistical likelihood that a certain type of item, such as a component-section, will meet or exceed performance standards at a given year in its lifecycle. This is the opposite condition of FIG. 1B. This may be considered a statistical estimate of the reliability of that type of item at a specific point in time and thus, this curve is often termed the "reliability curve." Although each of the above relationships (curves) provide useful information, none provide a mathematical relationship relating a condition metric, such as the CI of BUILDER®, to time as used in embodiments of the present invention.

Because the reliability curve relates the probability that an item will perform adequately in service at a specific age, select embodiments of the present invention assume that the condition state of the item, such as a component-section, is proportional to its reliability.

In developing embodiments of a lifecycle mathematical model describing the future condition state of a given item, such as a component-section, terms are defined as below.

Condition relates to the physical condition state and quantifies the general "health" of an item, such as a building component-section. Physical deterioration of the building due to normal aging, extraordinary use or poor maintenance may reduce performance of the component-section. In the BUILDERS® EMS, condition is measured in absolute terms by the use of a condition index (CI). The CI employs a scale of 0-100 with 100 defining "Defect-Free." This same scale is used for every item, e.g., component-section, in the BUILDER® EMS. In BUILDER®, a reduced condition state, as may be caused by distresses present in a component-section, may be observed during structured, objective, and repeatable inspections. These identified distresses adversely impact performance of the component-section and the distress impacts are quantified during the inspections. Through a "deduct value" process based on the type, severity, and density of distresses present, a CI is computed. A "baseline" CI of 100, i.e., Defect-Free, is assumed at installation. This may not be the case if factors such as improper installation or poor workmanship are present. At the opposite end of the spectrum from the baseline, i.e., a defined failure state, the condition index reaches some terminal value, $CI_T$, not necessarily zero.

Service Life is the length of time, statistically estimated, that a given item, such as a component-section, is expected to meet or exceed performance standards, e.g., as may be described by a relationship as in FIG. 1C. When an item is no longer usable for its function, its age has exceeded its service life. Service life is measured from installation or construction of the item. Two criteria are used to define service life: degradation and obsolescence. Actual service life ($SL_A$) is defined by which of the two criteria defines the shortest period. Remaining service life (RSL) is the current statistically estimated service life minus current age. Thus, RSL may be increased from what would have been estimated at installation, for example, if preventive maintenance, upgrades, repair or the like are done to extend life. Further, an inspection may indicate less degradation than expected and, thus, current (updated) service life may be estimated to be longer than expected at installation. Service life may also be decreased, e.g., if a catastrophic defect occurred or the item is deteriorating more quickly than estimated at installation or construction. Select embodiments of the present invention address degradation-based service life changes, i.e., current RSL changes based on quantitative data obtained from inspections.

Reliability may be defined as the statistical probability that an item, such as a component-section, will meet or exceed performance standards for an average estimated service life. In select embodiments of the present invention, one factor contributing to quantitative estimates of reliability is the amount of time a component has been in service. In select embodiments of the present invention, a relationship is established between condition and reliability. Natural physical assumptions related to the condition/life relationship may be made:

the CI is between 0 and 100;
the CI is 100 at the start of the service life;
the CI approaches zero asymptotically, and
the CI does not increase unless there is corrective action, e.g., preventive maintenance.

In select embodiments of the present invention, although many probability distributions were considered, the Weibull probability distribution was chosen to mathematically model the condition lifecycle curve as the best suited for the reasons discussed below.

The Weibull cumulative probability distribution function, as described above in Eqn. (1), is used to represent the probability of time to failure of a component-section in service. It is a "best fit" for mathematically describing the reliability of a specific item at a given time. The Weibull distribution function has natural boundary conditions that fit the above assumptions. The Weibull distribution takes the shape of a classical condition deterioration (degradation) curve as shown in FIG. 1B.

Figure 2:
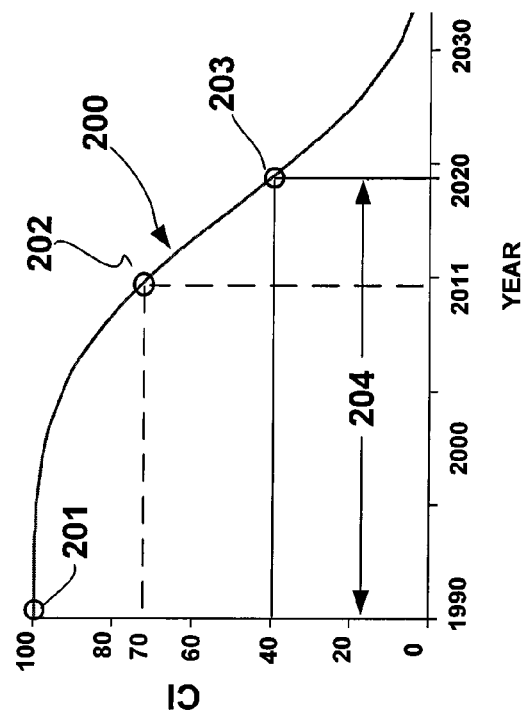
FIG. 2 illustrates the employment of three assumptions for initiating an initial condition lifecycle curve of an embodiment of the present invention.

In select embodiments of the present invention, the first step of the dynamic condition lifecycle mathematical model makes initial assumptions to compute the mathematical model parameters a, $\alpha$, and $\beta$ that describe the relationship that defines the condition lifecycle curve 200 (FIG. 2). This is usually performed when the item is just installed or there is no inspection data yet available. That is, the only data available are installation (or construction) date and expected service life. Assumptions of at least the initial deterioration rate are then made. For example, it may be assumed that approximately 70% of useful condition of an item remains after the first 70% of its service life as indicated in FIG. 2.

Refer to FIG. 2 in which three assumptions 201, 202, 203 are illustrated for an item with an estimated 30-year service life 204. The first assumption 201 is that the CI is 100 at installation (start of service life 204). The second assumption 202 is that 30% degradation of useful condition (CI=70) has occurred at 70% (year 2011) of service life 204. The third assumption 203 is that useful life is over at 60% degradation (CI=40). For this example, these three "quantitative" assumptions 201, 202, 203 initialize a lifecycle condition mathematical model of an embodiment of the present invention when no other data exist. Of course two other assumptions must be employed to draw a smooth curve: the CI approaches zero asymptotically and the CI can only decrease unless there is corrective action, e.g., an upgrade, preventive maintenance and the like.

Each assumption results in a data point 201, 202, 203 that is a function of time in service (Year) and condition as quantified by the CI. The three mathematical model parameters, a, $\alpha$, and $\beta$, are then solved using the three quantitative assumptions 201, 202, 203 and two non-quantitative assumptions to define the shape of the condition lifecycle curve 200.

Data harvesting methods and analysis are used to obtain improved estimates upon the initial assumptions 201, 202, 203. If historical lifecycle data are available for identical items, such as component-sections, in a given usage and geographic area, the shape of the initial curve for a new item will be based on that data and not the 30-70 assumption described above.

It is apparent that very general assumptions exist for a given item, such as a component-section, when initially projecting the lifecycle. These assumptions may be reflective of a typical item, but may not account for any localized conditions that may affect the reliability or behavior of a specific item, such as a component-section operating in a given building. Therefore, as time passes and an item ages and degrades, the condition of the item must be assessed to validate the condition lifecycle by comparing an expected condition with an actual condition.

As an item, such as a component-section, ages and inspections of it are performed, accumulated empirical data are used to adjust the condition lifecycle curve. Actual condition data may be used to mathematically model expected behavior of the item, such as a component-section, in like conditions, establishing a reliability profile that may be employed initially, e.g., at installation, with revised values for the parameters a, $\alpha$, and $\beta$. Thus, the initial expected service life, an industry average estimate for an item, such as a component-section of a building, may be re-adjusted based on data on actual degradation rates. This is further described below in describing the flow chart of FIG. 5.

Figure 3:
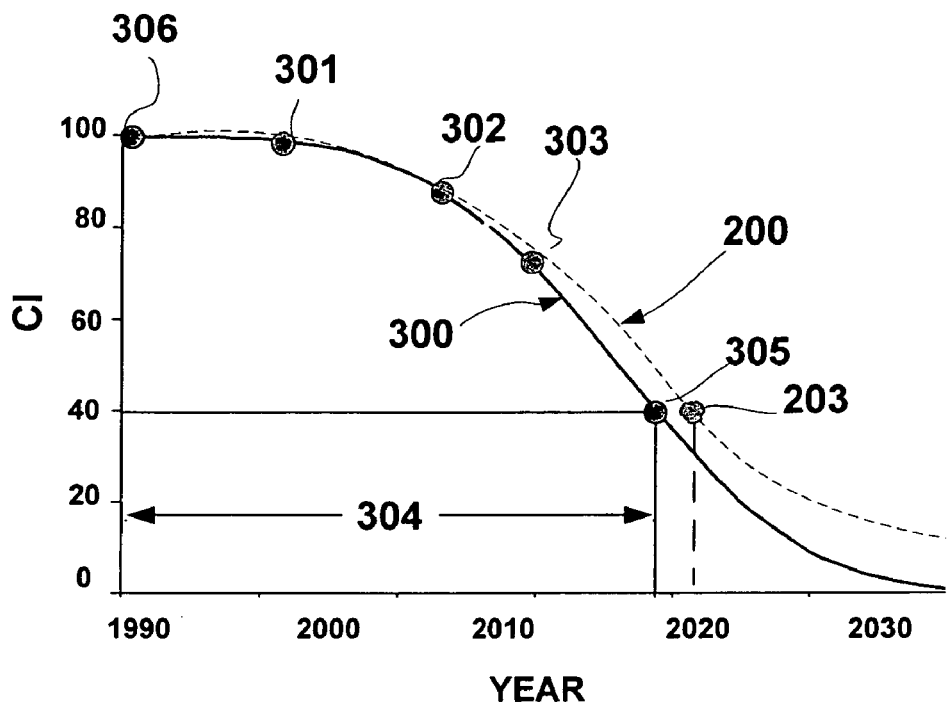
FIG. 3 depicts how collected inspection data provided at three inspections impact a condition lifecycle curve of an embodiment of the present invention, in this example reducing the expected service life.

Refer to FIG. 3 illustrating how collected inspection data provided at three inspections 301, 302, 303 can change the condition lifecycle curve 300. As shown, the expected service life 304 is reduced compared to the service life 204 estimated by the original lifecycle curve 200 of FIG. 2. Although FIG. 3 shows a reduction in service life for illustrative purposes, the inspection data may be such as to have the estimated service life unchanged or even extended.

After installation 306 (or construction), several inspections 301, 302, 303 and concomitant data input to the mathematical model, an embodiment of the present invention accumulates temporal data related to the condition of the item, such as a component-section, and the CI is able to be computed, e.g., using an EMS program such as BUILDER®. However, some inspections, and thus some data, are more accurate, more thorough, or both, than others. Thus, data quality may depend on the type of inspection done, the level of inspection detail, and the time of the inspection. In select embodiments of the present invention, a condition lifecycle process factors in these differences when updating the mathematical model. For example, a weighting scale may be applied to the data.

A mathematical model based on the Weibull distribution has three parameters, or degrees of freedom, to define the condition lifecycle curve in a manner analogous to that done for a reliability curve. However, employing the initial installation or construction date, the initial expected service life date, and data from several inspections, more than three data points may be available. In select embodiments of the present invention, the mathematical model uses regression analysis to fit the condition lifecycle curve through data points by minimizing a "sum of the squares" residual error. Each data point is associated with a weighting factor that modifies its residual error. The more accurate a data point, the higher the value of the weighting factor and the more effect it has on the adjusted mathematical model, since the residual error will be less. Further, in select embodiments of the present invention, the adjusted condition lifecycle curve always passes through the plot of the last known condition index as may have been established empirically by the latest inspection, for example.

In select embodiments of the present invention, some factors that may affect the weighting values include the certainty of the installation date, the age of inspections, the type of inspection done (e.g., detailed distress survey or simple direct rating), the change in condition between inspections, and the like.

In select embodiments of the present invention, inspection scheduling is an important factor in condition prediction. For example, quantitative inspections provide data to the BUILDER® EMS for self-correcting the mathematical model based on locally observed conditions. Thus, a condition lifecycle mathematical model is assured of being most accurate in the period near a recent inspection, i.e., at a validated data point. As the time since last inspection increases, predictions on the existing condition lifecycle curve become less certain. Thus, scheduling follow-on inspections may depend on such factors as the "time since last update" of the condition lifecycle itself, the certainty of a predicted value, the consequences of error in prediction, and the like. Of course, conducting a follow-on inspection again verifies and self-corrects the condition lifecycle mathematical model. Further, select embodiments of the present invention employing the condition lifecycle mathematical model justify benefits of scheduling inspections by providing a scientifically sound quantified basis therefor. Any inspection expends money and personnel resources. Performing inspections at optimum intervals efficiently allocates resources and timely provides only that data necessary to make sound decisions.

Example procedures for scheduling inspections are discussed in the referenced Uzarski et al. '544 patent. In select embodiments of the present invention, condition lifecycle development procedures enumerate condition classifications that may be used with the knowledge based-inspection scheduling procedures of the Uzarski et al. '544 patent.

Figure 4:
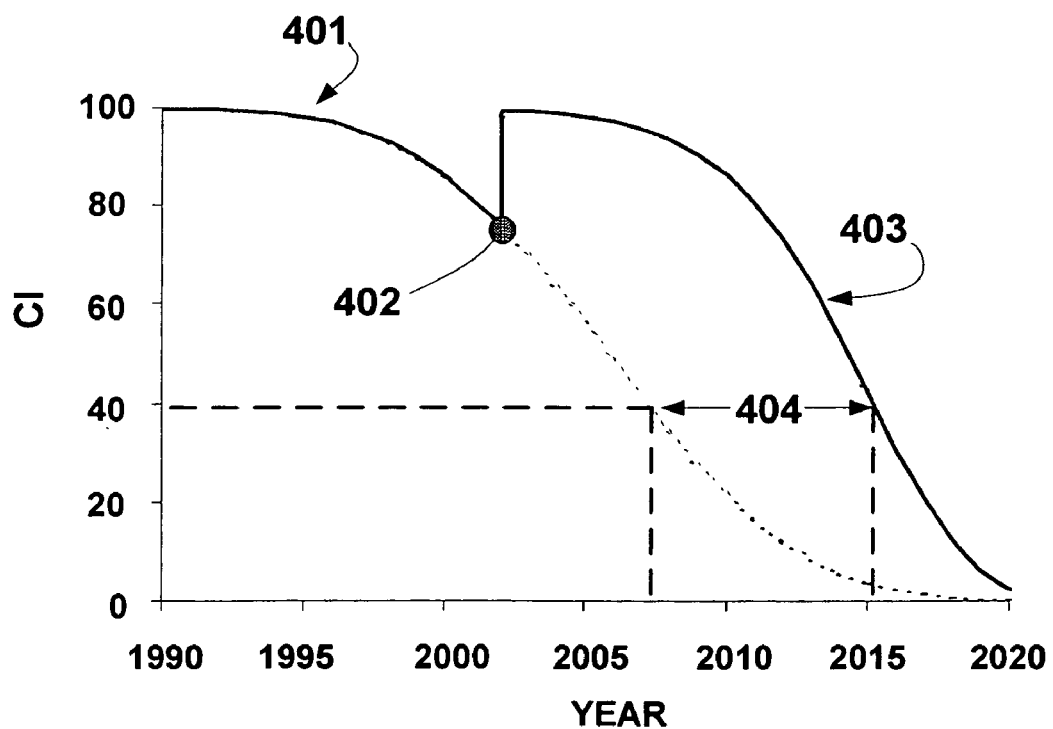
FIG. 4 illustrates the change in the condition lifecycle curve of an embodiment of the present invention when initially unplanned effort is expended during the lifecycle of an item.

In addition to adjusting the condition lifecycle mathematical model based on inspection information, actions such as preventive maintenance, corrective repair, manufacturer's upgrades, modifications, and the like effort may impact the condition trend. Refer to FIG. 4, illustrating the effect on the initial curve 401, an output of a mathematical model of an embodiment of the present invention, when an "effort" 402 is conducted on a specific item, such as a component-section, resulting in the modified curve 403 extending 404 the service life approximately eight years. In select embodiments of the present invention, data related to condition trends before such action occurs complement other data to predict response of the item after completion of the action. For example, before any such work is initiated, the lifecycle condition mathematical model may compute a condition trend over the lifecycle of an item, such as a component-section. Projected condition, i.e., the CI, may drop to a threshold (or standard) where corrective maintenance, repair, upgrade, or the like is recommended. If this effort is not undertaken, the item continues on its predicted condition trend. If the recommended effort is expended, then the mathematical model executes a step function as at 402 at the time of the effort. This raises the condition index. For example, in select embodiments of the present invention, the default value for the subsequent CI value is 95. That is, the condition lifecycle mathematical model assumes that the effort does not restore the condition of the item to "as-new" condition of 100 unless the user overrides this assumption. Note: BUILDER® accommodates a post-repair quality assurance inspection. In select embodiments of the present invention, if an inspection is done, the CI derived from the inspection is used in the condition lifecycle mathematical model. To predict how the condition trend will respond after the effort, the established trend "pre-effort" may be extended to the current "post-effort" condition.

In select embodiments of the present invention, the lifecycle condition mathematical model accounts for age at the time of the effort, e.g., a repair. As compared to newer items, those with early installation dates are mathematically modeled to degrade sooner after post-repair deterioration with a higher degradation rate than their "pre-enhancement" rate. Thus the lifecycle condition mathematical model establishes a realistic lifecycle in which multiple "enhancements" cannot extend the finite life of an item, such as a building component-section, indefinitely. That is, item replacement is required eventually to reset the service life clock. As described above, data from periodic inspections of the "enhanced" item enable adjustment to the condition lifecycle curve as was done prior to enhancement.

In select embodiments of the present invention, when the item is replaced with an identical unit, i.e., replacement "in kind", the condition lifecycle mathematical model employs the data from the trend curve of the replaced item to initialize the new unit. The service life clock is reset using local empirical data related to the behavior of the replaced unit while in service locally.

Thus, select embodiments of the present invention provide an ability to evaluate the benefits and consequences of "repair or replace" decisions. Using the projected information about the lifecycle behavior of the item after an enhancement, such as an upgrade, is performed, a quantitative benefit in terms of improved condition and extended service life may be computed. This "benefit" may be compared to the consequence of continued downward degradation from doing nothing, thereby providing the framework for benefit-cost or return-on-investment analysis.

For example, FIG. 4 shows the additional predicted service life gain 404 due to an enhancement effort 402, e.g., a repair. This extension of service life delays impending capitalized replacement cost initially predicted by the curve 401 to be about 17 years. Therefore, this enhancement and extended service life represents measurable benefit, i.e., deferment of replacement. If replacement cost is annualized over the expected service life, the extended service life 404 multiplied by the annualized replacement cost represents monetary benefit of this action. This can be compared to the actual repair cost to calculate a return on investment for objective work prioritization.

Figure 5:
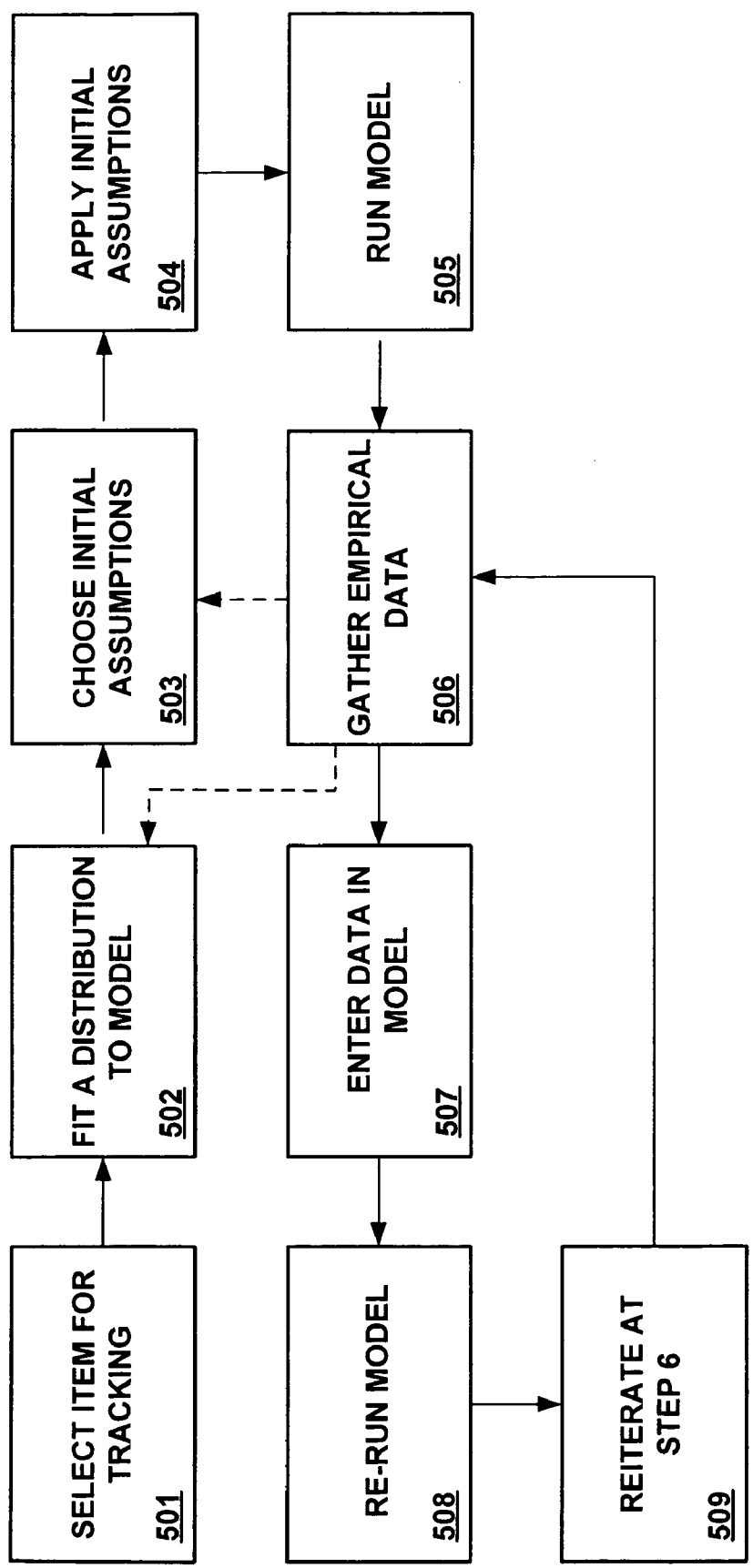
FIG. 5 is a flow chart for implementing an embodiment of the present invention as may be used as part of an engineering management system.

Refer to FIG. 5, a flow chart of a method to implement a model as an embodiment of the present invention. Initially an item, such as a component-section of a building, is selected 501 for tracking in a maintenance program such as may be part of an engineering management system. Based on some characteristic, performance, historical data, industry standard or the like, a distribution, such as the Weibull distribution, is fit 502 to the model. Initial assumptions are chosen 503 for establishing an initial relationship between a condition index (CI) and time. The initial assumptions are applied 504 and an initial relationship established by running 505 the model. Empirical data, such as inspection reports, manufacturer's brochures and the like are gathered 506 and entered 507 in the model. Some empirical data may have been used to select the model for fitting 502, for choosing initial assumptions 503, or both, as noted by the dotted lines of FIG. 5. The model is re-run 508 after data entry 507 and the process is reiterated 509 as additional empirical data are gathered.

In sum, select embodiments of the present invention contribute objective measurable standards for facility management by:

quantitatively assessing current condition of an item, such as a component-section, based on past inspection data, industry standards, historical use date, and the like;

quantitatively justifying inspection schedules based on condition trends;

quantifying needs for future enhancements, if any, to meet a threshold or standard; and computing consequences of action and inaction by projecting future condition based on either.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract is provided to comply with the rules requiring an abstract, which will allow a searcher to quickly ascertain the subject matter of the technical disclosure of any patent issued from this disclosure. 37 CFR §1.72(b). Any advantages and benefits described may not apply to all embodiments of the invention.

We claim:

1. A tool for use in managing operations and maintenance (O&M) of facilities comprising multiple items, comprising:
   computer readable media incorporating:
   a mathematical model that employs pre-specified parameters to adjust a relationship of a condition index (CI) to time for at least one said item, said model automatically adjusting said relationship of said CI to time to reflect at least observed changes to said at least one item, said changes input as updates to categories of data;
   data of a first type in at least one of said categories of data representing at least assumptions and comprising data points;
   wherein at least one said assumption is related to said at least one item, said at least one assumption asserted as at least one limitation in said mathematical model;
   data of a second type in at least one of said categories of data representing at least some empirical observations related to said at least one item,
   wherein at least some of said updates utilize at least said data of a second type; at least one specially configured computer in operable communication with said computer readable media, said at least one specially configured computer specially configured to at least execute said mathematical model; and
   at least one display in operable communication with each said at least one specially configured computer,
   wherein on at least said at least one display, said adjustable relationship of said CI to time is at least presented as one curve of CI versus time in which said at least one curve is adjusted to include the last said change input as a point on said curve, and wherein use of said tool yields at least quantitative measures of the impact on at least O&M lifecycle cost of most recent upgrades, repairs and preventive maintenance actions to at least said at least one item.

2. The tool of claim 1 in which said assumptions are used to define parameters to initially establish said CI, said assumptions at least comprising:
said CI is between 0 and 100;
said CI is 100 at the start of service life of each of said multiple items selected for review;
said CI approaches zero asymptotically;
said service life of each of said multiple items selected for review is defined at a pre-specified value of CI occurring at a pre-specified time; and
said CI decreases over time for each of said multiple items without at least an enhancement to each of said multiple items.

3. The tool of claim 2 said data of a second type selected from the group of said updates consisting of: data on enhancements made to each of said multiple items selected for review, data from inspections made of each of said multiple items selected for review, historical data related to each of said multiple items selected for review by item type, historical data related to replaced ones of said multiple items selected for review of the same said item type, industrial data related to said item type of said multiple items selected for review, and combinations thereof.

4. The tool of claim 3 in which said enhancements are selected from the group consisting of: corrective actions, repairs, upgrades, preventive maintenance, scheduled maintenance, and combinations thereof.

5. The tool of claim 2 in which said parameters are a, $\alpha$, and $\beta$ as used in the mathematical relationship defining a Weibull distribution, $$C(t)=a\times e^{-(t/\beta)^\alpha}$$

where:
C(t)=said condition index (CI) as a function of time,
t=normalized age (years) with respect to design life of said item,
a=parameter, initial steady state condition index,
$\beta$=parameter, service life adjustment factor,
$\alpha$=parameter, accelerated deterioration factor,
wherein each said parameter for setting an initial said C(t) is derived from selected said assumptions.

6. The tool of claim 2 in which said pre-specified value of said CI is between about 60 to about 80 and said pre-specified time is equal to between about 60% to about 80% of said service life.

7. The tool of claim 6 in which said pre-specified value of said CI is about 70 and said pre-specified time in service is about 70% of said service life.

8. The tool of claim 3, said mathematical model further incorporating at least one factor to adjust for differences resulting from said updates to said data of a second type.

9. The tool of claim 8 said at least one factor comprising at least one weighting scale that can be applied to at least some of said data of a second type.

10. The tool of claim 9 further employing regression analysis to update a curve of said CI v. time by minimizing a "sum of the squares" residual error, wherein each said data point of said data of a second type is associated with one said weighting scale that modifies the value of said data point based on the residual error of said data point; and wherein the smaller said residual error in said data point is, the higher is the value of said weighting scale, and wherein said updated curve passes through a plot of the last recorded said condition index.

11. A method for employing mathematical models in a tool for use in managing facilities comprising multiple items, said tool residing on computer readable media, said method comprising:
executing at least one of said mathematical models by at least initially establishing a time-dependent relationship for a condition index (CI) for at least one of said multiple items;
employing said mathematical model to further automatically adjust said CI to reflect at least impacts to said time-dependent statistical relationship for a Cl, said impacts input as updates to data in pre-specified categories;
incorporating as said time-dependent relationship at least the equation $$C(t)=a\times e^{-(t/\beta)^\alpha}$$

in at least one of said mathematical models,
where:
C(t)=said condition index (CI) as a function of time,
T=normalized age (years) with respect to design life of said item,
a=parameter, initial steady state condition index,
$\beta$=parameter, service life adjustment factor,
$\alpha$=parameter, accelerated deterioration factor; and
executing said mathematical model incorporating said equation on at least one specially configured computer, inputs for developing said parameters comprising:
data of a first type in at least one of said pre-specified categories of data comprising data points;
at least one quantitatively described assumption related to said at least one of multiple items; and
data of a second type in at least one of said pre-specified categories of data comprising at least some empirical data collected about said at least one of multiple items,
wherein at least some of said data of a second type are used in said updates; and
displaying results of using said tool,
wherein said results are presented as at least one curve of said adjustable CI versus time in which said at least one curve is adjusted to include the last said impact input as a point on said curve, and
wherein employing said method yields at least quantitative measures of the impact on at least O&M lifecycle cost of at least most recent upgrades, repairs and preventive maintenance actions to at least said multiple items.

12. An engineering management system (EMS), said EMS incorporating therein a management tool to manage facilities comprising multiple items, said tool comprising:
computer readable media incorporating:
a mathematical model that establishes an adjustable time-dependent relationship of a lifecycle condition index (CI) for at least one of said multiple items, said model employed to further automatically adjust said CI to reflect at least observed impacts to said adjustable time-dependent relationship, said impacts input as updates to data in pre-specified categories;
data of a first type in at least one of said pre-specified categories, said data of a first type comprising data points;
at least one assumption related to said at least one of said multiple items, said at least one assumption asserted as at least one limitation in said mathematical model;

data of a second type in at least one of said pre-specified categories, said data of a second type representing at least some empirical observations related to said multiple items,
wherein results of inspections and industry data are input as said empirical observations data for said EMS empirical observations, and
wherein some said updates utilize at least said data of a second type; at least one specially configured computer in operable communication with said computer-readable media, said at least one specially configured computer specially configured to execute said mathematical model; and
at least one display in operable communication with said at least one specially configured computer,
wherein on said at least one display said adjustable CI is at least presented as at least one curve of said adjustable CI versus time in which said at least one curve is adjusted to include the last said impact input as a point on said curve, and wherein use of said tool yields at least quantitative measures of the impact on at least O&M lifecycle cost of at least most recent upgrades, repairs and preventive maintenance actions to said multiple items.

13. A method for executing a mathematical model to yield at least one quantitative measure to aid operation and maintenance (O&M) personnel in managing facilities incorporating multiple items, comprising:
1) selecting at least one of said multiple items;
2) establishing at least one mathematical relationship between pre-specified parameters related to a condition index (CI) of said multiple items and time to yield at least one first said quantitative measure,
3) choosing one said at least one mathematical relationship, including at least one of said pre-specified parameters, for incorporating in said mathematical model,
wherein at least one said mathematical relationship comprises at least one type of statistical distribution;
4) choosing at least one assumption related to said multiple items and said chosen mathematical relationship for incorporation in said mathematical model,
wherein said at least one assumption is provided from at least one category of data as data of a first type comprising data points;
5) applying said at least one assumption in said mathematical model;
6) executing said mathematical model on at least one specially configured computer;
7) gathering data of a second type containing at least empirical data related to the condition of said at least one item as defined by said at least one mathematical relationship to input updates to said at least one parameter of said mathematical model,
wherein said empirical data are from at least one category of data of a second type comprising at least some empirical data collected about at least one of said multiple items;
8) entering said data of a second type in said mathematical model;
9) re-executing said mathematical model on said at least one specially configured computer; and
10) repeating steps 7-9 as said updates of said data of a second type are input, resulting in automatic adjustment to said CI during the service life of said at least one item,
wherein results from executing said mathematical model are presented as at least one curve of said CI versus time in which said at least one curve is adjusted to include the last said change input as a point on said curve for said multiple items, and wherein employing said mathematical model yields at least quantitative measures of the impact on O&M lifecycle cost of at least most recent upgrades, repairs and preventive maintenance actions to said multiple items.

14. The method of claim 13 further comprising gathering some said empirical data related to characteristics of said multiple items selected from the group consisting of: manufacturer's bulletins, upgrades, refurbishment, improvements, preventive maintenance, repair, replacement and combinations thereof, for inputting to steps 3, 4 and 7.

15. At least one specially configured computer for use in managing facilities comprising multiple items, said computer in operable communication with computer readable media, said media incorporating:
a mathematical model that establishes an adjustable time-dependent mathematical relationship for a condition index (CI) for at least one of said multiple items, said mathematical model automatically adjusting said CI to reflect at least observed impacts to said time-dependent mathematical relationship, said impacts input as updates to data in pre-specified categories, said mathematical model incorporating at least one type of statistical distribution in said mathematical model and at least one factor to adjust for differences in at least said empirical data upon said updating of said mathematical model;
data of a first type in said pre-specified categories of data, said data of a first type comprising data points;
at least one assumption related to said multiple items, said at least one assumption asserted as at least one limitation in said mathematical model;
data of a second type in said pre-specified categories, said data of a second type representing at least some empirical observations related to said multiple items,
wherein some said updates utilize said data of a second type; and
at least one display in operable communication with said specially configured computer,
wherein on at least said display, said adjustable CI is presented as at least one curve of said adjustable CI versus time in which said curve is adjusted to include the last said impact input as a point on said curve, and
wherein use of said data of said first and said second type on said computer readable media with said specially configured computer yields at least quantitative measures of the impact on O&M lifecycle cost of at least most recent upgrades, repairs and preventive maintenance actions said multiple items.

16. The specially configured computer of claim 15, said at least one factor comprising at least one weighting scale that is applied to at least some of said empirical data.

17. The specially configured computer of claim 16 further incorporating a regression analysis algorithm to fit a lifecycle condition index curve by minimizing a "sum of the squares" residual error,
wherein each said data point is associated with said at least one weighting scale that modifies any residual error associated with said data point; and
wherein the more accurate said data point is, the higher the value of said weighting scale in defining an adjusted lifecycle condition index curve.

* * * * *